US005510055A

United States Patent [19]

Raimann

[11] Patent Number: 5,510,055

[45] Date of Patent: Apr. 23, 1996

[54] BLEACHING REGULATOR COMPOSITIONS AND BLEACHING PROCESSES USING THEM

[75] Inventor: Wolfgang Raimann, Odenthal-Gloebusch, Germany

[73] Assignee: Bayer Aktiengesellschaft, Leverkusen, Germany

[21] Appl. No.: 391,376

[22] Filed: Feb. 17, 1995

Related U.S. Application Data

[63] Continuation of Ser. No. 12,684, Feb. 3, 1993, abandoned.

[30] Foreign Application Priority Data

Feb. 10, 1992 [DE] Germany .......................... 42 03 797.2

[51] Int. Cl.$^{6}$ .................................................... C01B 15/00

[52] U.S. Cl. ................................ 252/186.25; 252/186.28; 252/186.29; 252/95

[58] Field of Search ......................... 252/186.25, 186.27, 252/186.28, 186.29, 186.43, 95

[56] References Cited

U.S. PATENT DOCUMENTS

| | | | |
|---|---|---|---|
| 2,927,082 | 3/1960 | Young | 252/186.1 |
| 3,345,303 | 10/1967 | Schmid et al. | 252/186.1 |
| 3,740,187 | 6/1973 | Kowalski | 8/111 |
| 3,860,391 | 1/1975 | Kling et al. | 8/111 |
| 4,075,116 | 2/1978 | Mesaros | 252/102 |
| 4,880,566 | 11/1989 | Baehr et al. | 252/389.22 |
| 5,362,412 | 11/1994 | Hartman et al. | 252/94 |

FOREIGN PATENT DOCUMENTS

| | | |
|---|---|---|
| 2253864 | 9/1992 | United Kingdom . |

OTHER PUBLICATIONS

C.A. 85 (1976), 194060, abstracting JP 76/30184.

"Chemical Abstracts", vol. 84, No. 18, May 3, 1976, Columbus, Ohio, abstract No. 123349, Yotsuya, Minoru, et al., Bleaching of textiles.

"Chemical Abstracts", vol. 78, No. 12, Mar. 26, 1973, Columbus, Ohio, abstract No. 73587, Kakinuma, Kazumi, et al., Bleaching of . . . acid.

*Primary Examiner*—Gary Geist
*Assistant Examiner*—Joseph D. Anthony
*Attorney, Agent, or Firm*—William C. Gerstenzang; Sprung Horn Kramer & Woods

[57] ABSTRACT

Bleaching regulator compositions of good ecological tolerance which, in the anhydrous and alkali-free form, comprise magnesium ions, for example, in the form of magnesium oxide, gluconic acid and nitrilotriacetic acid, and furthermore can contain citric acid, are described. They contain no ethylenediaminetetraacetic acid (EDTA), no phosphates and no phosphonates.

13 Claims, No Drawings

BLEACHING REGULATOR COMPOSITIONS AND BLEACHING PROCESSES USING THEM

This application is a continuation of application Ser. No. 08/012,684, filed on Feb. 3, 1993, now abandoned.

BACKGROUND OF THE INVENTION

The invention relates to bleaching regulator (stabiliser) compositions for bleaching with $H_2O_2$, which contain gluconic acid, nitrilotriacetic acid and magnesium in ionic form, which furthermore may be accompanied by a content of citric acid. Such bleaching regulators are employed in aqueous solution which has been rendered alkaline.

Naturally occurring plant fibres, such as cotton, sisal, jute and the like, contain, in the crude form, waxes, fats and other plant constituents which cause a yellowish-brown colouring of the fibre. As a result, not all the desired dyeings are possible; moreover the dyeing results are unlevel. These fibres are therefore subjected to a treatment in which bleaching and washing are combined, in order to remove the undesirable non-fibrous constituents and to destroy the substances which cause the yellowish-brown colouring. Such a treatment can be applied on the fibres of the origin mentioned, on yarns produced therefrom and on woven fabric, knitted fabric or nonwovens of such fibres. This treatment furthermore can be applied on mixtures of such fibres with synthetic fibres and products produced therefrom.

So-called bleaching liquors which comprise water, hydrogen peroxide, wetting agents/detergents and emulsifiers, alkali to adjust the pH and $H_2O_2$ regulators (stabilisers) are employed for carrying out the combined treatment mentioned. Sodium Silicate and inorganic phosphates, for example, have been employed as regulators for a long time. Because of excessive fertilisation of the waste waters, the inorganic phosphates were later replaced by (poly)phosphonates. However, these phosphonates are difficult or even impossible to degrade, and thus pollute the waste waters again in a different manner. The non-biodegradable ethylenediaminetetraacetic acid (EDTA), which moreover is not absorbed by sewage sludge, is also unacceptable in its use as an $H_2O_2$ regulator. With EDTA, moreover, remobilisation of heavy metals is not completely excluded.

There was therefore a desire to provide completely phosphorus-free and EDTA-free bleaching regulators (stabilisers). However, development has shown to date that it does not seem possible to dispense with phosphates or phosphonates or EDTA in such regulators.

SUMMARY OF THE INVENTION

Bleaching regulator compositions have now been found which are employed in aqueous solution which has been rendered alkaline and comprise, in the anhydrous and alkali-free form, a) 0.1 to 20 parts by weight of magnesium ions, calculated as MgO, b) 3 to 200 parts by weight of gluconic acid, calculated as the free acid, c) 3 to 25 parts by weight of nitrilotriacetic acid, calculated as the free acid, and d) 0 to 40 parts by weight of citric acid, calculated as citric acid monohydrate.

DETAILED DESCRIPTION OF THE INVENTION

Preferably, constituent a) is present in an amount of 0.1 to 10 parts by weight, particularly preferably 0.1 to 8 parts by weight.

Preferably, furthermore, constituent b) is present in an amount of 10 to 150 parts by weight, particularly preferably 15 to 120 parts by weight.

Preferably, furthermore, constituent c) is present in an amount of 4 to 12 parts by weight, particularly preferably 4 to 8 parts by weight.

Preferably, furthermore, constituent d) is present in an a amount of 4 to 30 parts by weight, particularly preferably 5 to 25 parts by weight.

The bleaching regulator compositions according to the invention are employed in aqueous solution which has been rendered alkaline. Constituents a), b), c) and d) are present here together in an amount of 10 to 60% by weight, preferably 25 to 40% by weight, based on the total aqueous solution which has been rendered alkaline. To render the solution alkaline, an alkali metal hydroxide is added until a pH of 7.5 to 14 is reached.

Such a wide pH range up to a strongly alkaline adjustment is possible in principle because alkali must in any case be added to the bleaching liquor to which the bleaching regulator composition according to the invention are added. However, a lower pH has proved more favourable for increasing the storage stability of the bleaching regulator compositions according to the invention. Preferably, therefore, a pH of 7.5 o 12.5, particularly preferably 7.5 to 12, is established.

Sodium hydroxide is the preferred alkali metal hydroxide for reasons of cost, although KOH or LiOH are in principle also possible: it can be added either in solid form or in an aqueous solution of, for example, 10 to 60% strength by weight, which is easy to handle.

The invention furthermore relates to a process for bleaching naturally occurring plant fibres of their mixtures with synthetic fibres, of yarns, woven fabrics, knitted fabrics of nonwovens of such fibres of their mixtures, in bleaching liquors which comprise water, alkali, hydrogen peroxide, wetting agents, detergents an emulsifiers and bleaching regulators, which is characterised in that compositions of the type described above are employed as the bleaching regulators.

The process according to the invention can be carried out in a number of various embodiments, all of which are familiar to the expert as updated techniques: bleaching in a long liquor (discontinuous or continuous); cold pad-batch process (CPB); pad steam process; pad roll process and others.

Naturally occurring plant fibres, for example cotton, jute, linen or regenerated cellulose, and animal fibres, such as silk and wool, and mixtures thereof with synthetics, can be bleached according to the invention. Fibres which may be mentioned as preferred are plant fibres, particularly preferably cotton and mixtures thereof.

In addition to water, alkali metal hydroxide, wetting agents, detergents and emulsifying agents and hydrogen peroxide, a bleaching regulator composition according to the invention is employed in the bleaching liquors to be employed in the process according to the invention. Hydrogen peroxide is present here in an amount of 0.5– 100 ml/l, depending on the process. The alkali metal hydroxide is added and topped up in an amount to maintain a pH of 7.5 to 14 in the bleaching liquor. Wetting agents, detergents and emulsifiers are those which are known to the expert in this field. They are individual substances or mixtures of the known anionic, cationic or nonionic surfactants; they are preferably anionic or nonionic surfactants, such as fatty acids and salts thereof, fatty acid alkyl esters, fatty alcohols, fatty alcohol polyglycol ethers, glycerols, alkylaromaticsulphonic acids and the like.

These surfactants are chosen and composed in a manner known to the expert such that the undesirable concomitant substances of the naturally occurring plant fibres, such as fats, waxes and other plant constituents (for examples residues of seed capsules and the like) are removed. The water employed can be demineralised water or industrial water which is provided in the customary manner and is of varying hardness, depending on its occurrence.

The bleaching regulator compositions are used as stabilisers for the hydrogen peroxide. The release of oxygen for bleaching the fibres is regulated with these. Gluconic acid, nitrilotriacetic acid and, if appropriate, citric acid serve to complex and sequester alkaline earth metals, in particular the troublesome Ca ions, and heavy metals.

In principle, the complexing action of the mixture of gluconic acid and nitrilotriacetic acid is adequate. However, in many cases it is advantageous and is therefore an advantageous variant of the bleaching regulator compositions according to the invention for citric acid additionally to be employed. Gluconic acid and nitrilotriacetic acid can be employed either as the free acid or as an alkali metal salt (preferably as the sodium salt). Citric acid, if it is used, can also be employed as an alkali metal salt or as the free acid. Preferably, the citric acid is employed as the industrially available citric acid monohydrate.

Magnesium ions and calcium ions, as an example of alkaline earth metal ions, and iron, as an example of heavy metal ions, which are to be complexed, are naturally occurring constituents of the industrial water usually available. Alkaline earth metal ions and heavy metal ions furthermore can be introduced as impurities of the naturally occurring plant fibres to be bleached. If demineralised water is employed, both the complexing calcium and the magnesium desired as a co-stabiliser are lacking, while the constituents brought in by impurities of the naturally occurring plant fibres are still to be taken into consideration. If demineralised water is used, the amount of gluconic acid, nitrilotriacetic acid and, if citric acid is employed, of citric acid can be in the lower part of the stated ranges of amounts, while the missing magnesium must be compensated by using an amount in the upper part of the stated range of amounts.

These relationships, taking into consideration the water available and the quality of the fibre to be bleached, are known to the expert. The bleaching regulator compositions according to the invention are capable of meeting the entire use range described.

The bleaching regulator compositions according to the invention are prepared by simply bringing the constituents together, for example in the following sequence for the following typical composition:

1. 200 parts by weight of demineralised $H_2O$ are initially introduced into the mixing vessel;

2. 80 parts by weight of citric acid monohydrate are dissolved;

3. 20 parts by weight of MgO are dissolved;

4. 280 parts by weight of gluconic acid/Na gluconate (60% strength) are dissolved;

5. 50 parts by weight of nitrilotriacetic acid trisodium salt are dissolved;

6. 106 parts by weight of NaOH (50% strength) are added (pH at 8.5–9) and 7. 264 parts by weight of demineralised water are added as the remainder to make up to 1000 parts by weight.

To achieve materials which can be dyed without problems, it is usually necessary for other treatment stages also to be carried out beforehand or subsequently, beyond the bleaching:

Singeing, burning off the projecting fibre ends, in order to achieve a smooth surface. This is usually the first working operation.

Boiling off, scouring, that is to say hot alkali treatment with the aim of pre-extraction of the fibre concomitant substances or swelling of the fibres and seed husks of the cotton. This is usually carried out before bleaching.

Causticisation, mercerisation, treatment with highly concentrated alkali more or less under tension of the material to achieve a pronounced swelling of the fibres and therefore lustre and to eliminate the unripe or dead portions of cotton, which cannot be dyed or can be only poorly dyed. This can be carried out before or after bleaching.

Acid extraction is carried out before bleaching if extremely large amounts of heavy metal are present (industrial water and/or fibre substrate). The complexing agents of the bleaching regulator would be overtaxed.

Other bleaching processes before or after the hydrogen peroxide bleach are furthermore used to achieve very high whitenesses.

For example sodium hypochlorite bleaching sodium chlorite bleaching reductive bleaching with and without addition of whiteners.

If water-glass (sodium silicate) is used as a stabiliser, insoluble Ca silicate deposits occur on the machines and material, especially in association with Ca salts, which does not apply when the regulators according to the invention which are described are used.

The phosphonates which were used previously or are still used today and are regarded as irreplaceable are not biodegradable and pollute the waste waters. EDTA, which is also not degradable, moreover also pollutes waters because of the risk of remobilisation of heavy metal ions.

EXAMPLE 1

A typical bleaching regulator composition is obtained by bringing together 28% by weight of an aqueous sodium gluconate solution (60% strength): 5% by weight of nitrolotriacetic acid trisodium salt. 8% by weight of citric acid monohydrate, 2% by weight of magnesium oxide and 6% by weight of 50% sodium hydroxide solution. The remainder (51% by weight) is demineralised water. The composition had a pH of 7.5.

EXAMPLE 2

Typical bleaching liquors comprise

| | Process CPB bleaching |
|---|---|

| | | Long liquor 1) 60 min. 98° C. | 2) 24 hours room temperature | Pad steam 3) 10 min. 100° C. |
|---|---|---|---|---|
| Water of 0–20° German hardness possibly Mg salt | g/l | 0.1 | 0.2–0.4 | 0.2–0.4 |
| Bleaching regulator (according to the invention) | g/l | 0.5 | 8 | 4 |
| Sodium hydroxide solution (38% strength by weight) | g/l | 1 | 25 | 20 |
| Hydrogen peroxide (35% strength by weight) | g/l | 2 | 50 | 40 |
| Surfactant (wetting agent/ detergent) | g/l | 0.5 | 4 | 4 |

1) The raw material is bleached in a ratio to the liquor of 1:10 at the boiling point for 60 minutes, rinsed and dried.
2) CPB = cold pad-batch process; the material is padded with the bleaching liquor (100% liquor pick-up), left at room temperature for 24 hours, washed our and dried.
3) The desized material is padded with bleaching liquor (100% liquor pick-up), left in saturated steam (100° C.) for 10 minutes, washed and dried.

After the treatment, the materials are checked for damage and the brightening is measured.

EXAMPLE 3

Another typical variant of a composition of a regulator according to the invention is:

| | |
|---|---|
| 234.10 parts by weight | of demineralised water |
| 125.00 parts by weight | of citric acid monohydrate |
| 31.20 parts by weight | of magnesium oxide |
| 437.50 parts by weight | of gluconic acid/Na gluconate (60%) |
| 78.20 parts by weight | of nitrilotriacetic acid $Na_3$ salt |
| 94.00 parts by weight | of sodium hydroxide solution (50%) |

The composition has a pH of 7.5.

EXAMPLE 4

Bleaching regulator according to the invention without citric acid

| | |
|---|---|
| 618.00 parts by weight | of demineralised water |
| 20.00 parts by weight | of MgO |
| 280.00 parts by weight | of gluconic acid/Na gluconate (60%) |
| 50.00 parts by weight | of nitrilotriacetic acid $Na_3$ salt |
| 32.00 parts by weight | of NaOH, 50% |

| | Process | | |
|---|---|---|---|
| | 1 | 2 | 3 |
| Damage: | | | |
| DP values before bleaching | 2400 | 2400 | 2400 |
| DP values after bleaching | 2300 | 2250 | 2000 |
| Whiteness | | | |
| Reflectance 460 nm (%) after bleaching | 83.8 | 83.4 | 83.6 |

The same material was bleached under the above conditions using bleaching liquors which contained no regulator, and the following results were found, in comparison with the above values:

| | Process | | |
|---|---|---|---|
| | 1 | 2 | 3 |
| DP values after bleaching | 1950 | 2000 | 1590 |
| Whiteness Reflectance 460 nm (%) after bleaching | 79.5 | 79.4 | 78.3 |

EXAMPLE 5

The activity of the regulator according to the invention was demonstrated in boiling experiments under a reflux condenser using a typical bleaching liquor, the bleaching liquor being contaminated with iron salt ($Fe^{+++}$ sulphate 1:1000):

Procedure 200 ml of a bleaching liquor having the following composition were boiled under a reflux condenser for 30 minutes, and the contents of hydrogen peroxide were determined after 15 and 30 minutes (experiment a with a regulator according to the invention; experiment b without a regulator).

| | | Experiment | |
|---|---|---|---|
| Lewatit water | | a | b |
| Sodium hydroxide solution (32% strength by weight) | g/l | 5 | 5 |
| Regulator (according to the invention) | g/l | 3.5 | — |
| Hydrogen peroxide (35% strength by weight) | g/l | 10 | 10 |
| $Fe^{+++}$ sulphate solution (1:1000) | g/l | 20 | 20 |
| $H_2O_2$ content (ml/l) | | | |
| at the start | | 10.1 | 10.2 |
| after 15 minutes | | 8.3 | 0.5 |
| after 30 minutes | | 5.6 | 0 |

EXAMPLE 6

A further bleaching regulator composition is obtained from 80 parts by weight of citric acid monohydrate 20 parts by weight of MgO 280 parts by weight of Naglusol (gluconic acid/Na gluconate, 60% strength)

50 parts by weight of nitrilotriacetic acid $Na_3$ salt 106 parts by weight of sodium hydroxide solution (50% strength)

464 parts by weight of demineralised water.

The composition has a pH of 11.2.

What is claimed is:

1. A bleaching stabilizer composition which, when used is employed in an aqueous solution which has been rendered alkaline, which stabilizer composition consists of, relative to each other, a) 0.1 to 20 parts by weight of magnesium ions, calculated as MgO, b) 3 to 200 parts by weight of gluconic acid, an alkali metal salt thereof or a mixture of said acid and said salt, calculated as the free acid, c) 3 to 25 parts by weight of nitrilotriacetic acid, an alkali metal salt thereof or a mixture of said acid and said salt, calculated as the free acid, and d) 4 to 40 parts by weight of citric acid, an alkali metal salt thereof or a mixture of said acid and said salt, calculated as citric acid monohydrate, and wherein when used in said aqueous solution the constituents a), b), c) and d) together are present in an amount of from 10% to 60% by weight, based on the total weight of aqeous solution and wherein the alkalinity of said solution is adjusted to a pH of 7.5 to 14 by the addition of an alkali metal hydroxide and which contains no ethylenediaminetetraacetic acid no phosphates and no phosphonates.

2. The composition of claim 1, wherein constituents a), b), c) and d) together are present in an amount of 25 to 40% by weight.

3. The composition of claim 1, wherein sodium hydroxide in solid form or as a 10 to 60% strength by weight solution is employed as the alkali metal hydroxide.

4. The composition of claim 1, wherein constituent is present in an amount of 0.1 to 10 parts by weight.

5. The composition of claim 4, wherein constituent a) is present in an amount of 0.1 to 8 parts by weight.

6. The composition of claim 1 wherein constituent b) is present in an amount of 10 to 150 parts by weight.

7. The composition of claim 6, wherein constituent b) is present in an amount of 15 to 120 parts by weight.

8. The composition of claim 1, wherein constituent c) is present in an amount of 4 to 12 parts by weight.

9. The composition of claim 8, wherein constituent c) is present in an amount of 4 to 8 parts by weight.

10. The composition of claim 1, wherein constituent d) is present in an amount of 4 to 30 parts by weight.

11. The composition of claim 10, wherein constituent d) is present in an amount of 5 to 25 parts by weight.

12. The composition of claim 1, wherein an alkaline adjustment is carried out up to a pH of 7.5 to 12.5.

13. The composition of claim 12, wherein an alkaline adjustment is carried out up to a pH of 7.5 to 12.

* * * * *

UNITED STATES PATENT AND TRADEMARK OFFICE

CERTIFICATE OF CORRECTION

PATENT NO. : 5,510,055

DATED : April 23, 1996

INVENTOR(S) : Raimann, et al.

It is certified that error appears in the above-indentified patent and that said Letters Patent is hereby corrected as shown below:

Title page, item [19], " Raimann " insert -- et al. --

Title Page item [75] Inventor: After " Odenthal-Gloebush," insert -- Josef Pfeiffer, Leverkusen, --

Col. 8, line 1 After " constituent " insert -- a) --

Signed and Sealed this

Twenty-ninth Day of October 1996

Attest:

BRUCE LEHMAN

*Attesting Officer* *Commissioner of Patents and Trademarks*